(12) United States Patent
Hatamoto et al.

(10) Patent No.: US 12,104,859 B2
(45) Date of Patent: Oct. 1, 2024

(54) HEAT EXCHANGING APPARATUS

(71) Applicants: LONOVEGE CO., LTD., Kawasaki (JP); Hiroshi Hatamoto, Takasaki (JP)

(72) Inventors: Hiroshi Hatamoto, Takasaki (JP); Tadashi Mitsuyasu, Fujioka (JP)

(73) Assignees: Hiroshi Hatamoto, Takasaki (JP); Lonovege Co., Ltd., Kawasaki (JP)

( * ) Notice: Subject to any disclaimer, the term of this patent is extended or adjusted under 35 U.S.C. 154(b) by 296 days.

(21) Appl. No.: 17/640,852

(22) PCT Filed: Jul. 15, 2020

(86) PCT No.: PCT/JP2020/027466
§ 371 (c)(1),
(2) Date: Jul. 28, 2022

(87) PCT Pub. No.: WO2021/044738
PCT Pub. Date: Mar. 11, 2021

(65) Prior Publication Data
US 2022/0341672 A1 Oct. 27, 2022

(30) Foreign Application Priority Data
Sep. 6, 2019 (JP) ................................. 2019-162877

(51) Int. Cl.
*F28D 7/02* (2006.01)
*F28D 3/02* (2006.01)
(Continued)

(52) U.S. Cl.
CPC ............... *F28D 7/022* (2013.01); *F28D 3/02* (2013.01); *F28F 9/001* (2013.01); *F28F 9/0246* (2013.01); *F28F 2230/00* (2013.01)

(58) Field of Classification Search
CPC . F28D 3/02; F28F 9/001; F28F 9/0246; F28F 2230/00; F28F 25/04
See application file for complete search history.

(56) References Cited

U.S. PATENT DOCUMENTS

2010/0326639 A1* 12/2010 Ando ..................... F28D 1/0472
165/186
2019/0033001 A1* 1/2019 Hatamoto ................. F28D 3/02

FOREIGN PATENT DOCUMENTS

| JP | 50-028044 U1 | 4/1975 |
| JP | 57-175935 U1 | 11/1982 |

(Continued)

OTHER PUBLICATIONS

International Search Report, Japan Patent Office, Sep. 10, 2020.
1st Office Action, Chinese Patent Application No. 202080062027.7, issued Aug. 30, 2023.

*Primary Examiner* — Devon Russell
(74) *Attorney, Agent, or Firm* — Bay State IP, LLC

(57) ABSTRACT

A heat exchanging apparatus is adapted for differences in piping conditions at installation sites, reducing man-hours for manufacturing, management and installation for cost reduction. The heat exchanging apparatus includes a case open upward, a heat exchange unit housed in the case, and a storage tank arranged at an upper section of the case. A heat transfer medium inlet and a heat transfer medium outlet are open in the same direction at both ends of a heat transfer medium circulation pipe. A heat exchange fluid discharge port for discharging heat exchange fluid having dropped in the case is formed on one of side walls of the case either in the same direction as or in the opposite direction to the opening direction of the heat transfer medium inlet and the heat transfer medium outlet so that the heat exchange unit can be vertically taken in and out of the case.

4 Claims, 7 Drawing Sheets

(51) Int. Cl.
   *F28F 9/00*   (2006.01)
   *F28F 9/02*   (2006.01)

(56) References Cited

FOREIGN PATENT DOCUMENTS

| | | | | |
|---|---|---|---|---|
| JP | 2011158239 A | * | 8/2011 | |
| JP | 2014214987 A | * | 11/2014 | ............... F28D 1/04 |
| JP | 2017187244 A | * | 10/2017 | |
| JP | 6271816 B2 | | 1/2018 | |
| WO | WO-2018189887 A1 | * | 10/2018 | ............... F28D 3/02 |

* cited by examiner

HEAT EXCHANGING APPARATUS

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/JP2020/027466 filed on Jul. 15, 2020, and which in turn claims priority under 35 USC 119 to Japanese Patent Application No. 2019-162877 filed on Sep. 6, 2019.

TECHNICAL FIELD

The present invention relates to a heat exchanging apparatus for exchanging heat between a heat exchange fluid and a heat transfer medium flowing through a heat transfer medium circulation pipe of a heat exchange unit.

BACKGROUND ART

Conventionally, a heat exchanging apparatus of the falling liquid film type is known for cooling or heating heat exchange fluid by exchanging heat between a heat transfer medium (refrigerant or heat medium) flowing through a heat transfer medium circulation pipe and the heat exchange fluid while the heat exchange fluid flows down by its dead weight along an outer surface of the heat exchange fluid circulation pipe in the form of a liquid film. For instance, refer to Patent Document 1.

However, the conventional heat exchanging apparatus of the falling liquid film type has a problem that a case to which the heat exchange fluid circulation pipe is attached makes one difficult to clean and maintain the heat exchange fluid circulation pipe.

Under such circumstances, Patent Document 2 proposes a heat exchanging apparatus in which one of side walls of a case for housing a heat exchange unit including a heat exchange fluid circulation pipe is open, the heat exchange unit is attached to a lid member for opening and closing an opening of the case, and the lid member is slid horizontally together with the heat exchange unit to be taken out of the case when cleaning or maintaining the heat exchange fluid circulation pipe. According to this heat exchanging apparatus, the heat exchange fluid circulation pipe of the heat exchange unit taken out from the case can be easily cleaned and maintained.

RELATED ART DOCUMENTS

Patent Documents

[Patent Document 1] Japanese Unexamined Patent Publication No. 2011-158239.
[Patent Document 2] Japanese Patent No. 6271816.

DISCLOSURE OF THE INVENTION

Problem to be Solved by the Invention

In the heat exchanging apparatus proposed in Patent Document 2, a heat transfer medium inlet and a heat transfer medium outlet at both ends of the heat exchange fluid circulation pipe are open in the same direction, and a heat exchange fluid discharge port is formed on the case for discharging the heat exchange fluid having dropped down in the case to the outside of the case.

The heat exchanging apparatus adopting the above-described configuration has been made available in two types. One includes a heat exchange fluid discharge port formed on the opposite side of the case to the opening direction of the heat transfer medium inlet and the heat transfer medium outlet of the heat exchange fluid circulation pipe, and the other includes a heat exchange fluid discharge port formed on the underside of the case. However, when the discharge port is formed on the underside of the case, the pipe should pass under the apparatus, so that long legs to be necessarily provided at the bottom of the apparatus increase the cost of the heat exchanging apparatus. And at a low inflow height of the heat exchange fluid, the difficulty to install the apparatus and the necessity of pumping up and then allowing the heat exchange fluid to flow in should increase piping man-hours and cost. Further, if the discharge port is formed on the opposite side to the heat transfer medium inlet and the heat transfer medium outlet, there has been a problem of increase in installation man-hours and piping man-hours depending on given piping conditions at the installation site, thereby leading to cost increase.

Moreover, because of the necessity to seal the lid member and a peripheral edge of the opening of the case with a sealing material when the lid member is closed, there have been also concerns about an increase in the number of parts and leakage of the heat exchange fluid from the case owing to deterioration of the sealing material.

The present invention has been made in view of the above problems, and an object thereof is to provide one type of heat exchanging apparatus that can adapt for installation of the heat exchange fluid discharge port and the heat transfer medium inlet and outlet in the same direction or in different directions depending on given piping conditions at the installation site and reduce in overall height of the apparatus so as to reduce the number of steps required for manufacturing, management and installation for cost reduction, and to realize reduction in the number of parts and simplification of maintenance by eliminating sealing materials.

Means for Solving the Problem

In order to achieve the above object, the present invention is a heat exchanging apparatus (1) including a case (10) open upward, a heat exchange unit (20) housed in the case (10), and a storage tank (30) arranged at an upper section of the case (10). The apparatus is characterized in that heat exchange fluid stored in the storage tank (30) drops by its dead weight onto a heat transfer medium circulation pipe (21) of the heat exchange unit (20) so as to exchange heat between the heat exchange fluid and a heat transfer medium flowing through the heat transfer medium circulation pipe (21), a heat transfer medium inlet (21a) and a heat transfer medium outlet (21b) are open in the same direction at both ends of the heat transfer medium circulation pipe (21), and a heat exchange fluid discharge port (13) for discharging the heat exchange fluid having dropped in the case (10) is formed on one of side walls (10A) of the case (10) either in the same direction as or in the opposite direction to the opening direction of the heat transfer medium inlet (21a) and the heat transfer medium outlet (21b) so that the exchange unit (20) can be vertically taken in and out of the case (10).

According to the present invention, if the opening direction of the heat transfer medium inlet and the heat transfer medium outlet of the heat transfer medium circulation pipe is incompatible with the opening direction of the heat exchange fluid discharge port formed on the case under given piping conditions at the installation site of the heat exchanging apparatus, the opening direction of the heat transfer medium inlet and the heat transfer medium outlet and the opening direction of the heat exchange fluid discharge port formed on the case can be adjusted to meet the piping conditions at the installation site by taking out the heat exchange unit upward from the case, rotating it 180 degrees around the vertical axis, and then storing it in the case. Therefore, only one type of heat exchanging apparatus needs to be made available, whereby man-hours for manufacturing, managing, and installing the heat exchanging apparatus can be reduced for cost reduction.

In addition, no sealing material is required for sealing between the case and the heat exchange unit, realizing reduction in the number of parts and simplification of maintenance.

Here, in the above-described heat exchanging apparatus (1), the case (10) may include a rectangular box open upward, and a notch (12) of the same size and shape open upward may be formed at each of upper ends of a pair of opposite side walls (10A, 10B) of the case (10) respectively in the same direction as and in the opposite direction to the opening direction of the heat transfer medium inlet (21a) and the heat transfer medium outlet (21b) so that the heat transfer medium inlet (21a) and the heat transfer medium outlet (21b) can face either one of the notches (12).

The above-described configuration enables the heat transfer medium inlet and the heat transfer medium outlet of the heat transfer medium circulation pipe provided in the heat exchange unit to face either one of the notches regardless of the housing direction of the heat exchange unit in the case. Further, the notch formed on the case is open upward so as not to prevent the heat exchange unit from being taken in and out of the case.

Moreover, in the heat exchanging apparatus (1), the heat exchange unit (20) includes the heat transfer medium circulation pipe (21) spirally wound along the vertical direction and a rectangular frame body (22) for housing and holding the heat transfer medium circulation pipe (21). The heat transfer medium inlet (21a) and the heat transfer medium outlet (21b) are open on either one of fixing plates (23) vertically attached to two opposite positions of the rectangular frame body (22). Communication holes (23a), one of which communicates with the heat exchange fluid discharge port (13), may be formed on lower sections of both fixing plates (23).

According to the above configuration, regardless of the housing direction of the heat exchange unit in the case, either one of the communication holes formed on both fixing plates communicates with the heat exchange fluid discharge port of the case. Accordingly, even if the housing direction of the heat exchange unit is changed, the heat exchange fluid falling inside the case can be reliably discharged to the outside of the case through the communication hole and the heat exchange fluid discharge port communicating with each other.

Moreover, in the heat exchanging apparatus (1), the case (10) may be provided with a guide means (14) for guiding a slide in the vertical direction when the heat exchange unit (20) is taken in and out.

According to the above configuration, when the heat exchange unit is taken in and out of the case, the heat exchange unit can be smoothly slid up and down while being guided by the guide means, so that the heat exchange unit can be taken in and out of the case stably and reliably with no rattling.

Furthermore, in the heat exchanging apparatus (1), the guide means (14) may be composed of a notch (14) formed at each two opposite positions at both ends in the longitudinal direction of two flanges (10a) formed by bending inward at a right angle upper end edges of two opposite side walls (10C, 10D) facing each other so that the fixing plate (23) can be fitted into the notch.

According to the above configuration, the guide means for guiding the slide of the heat exchange unit in the vertical direction when the heat exchange unit is taken in and out of the case can be easily composed of the notch formed on the case, into which the fixing plate is fitted.

Effects of the Invention

According to the present invention, one type of heat exchanging apparatus is adaptable for different piping conditions at the installation site, thereby reducing the man-hours for manufacturing, managing, and installing the heat exchanging apparatus for cost reduction. In addition, effects of reduction in the number of parts and simplification of maintenance can be achieved by eliminating the sealing materials.

MODES FOR CARRYING OUT THE INVENTION

Hereinafter, embodiments of the present invention will be described with reference to the accompanying drawings.

Figure 1:
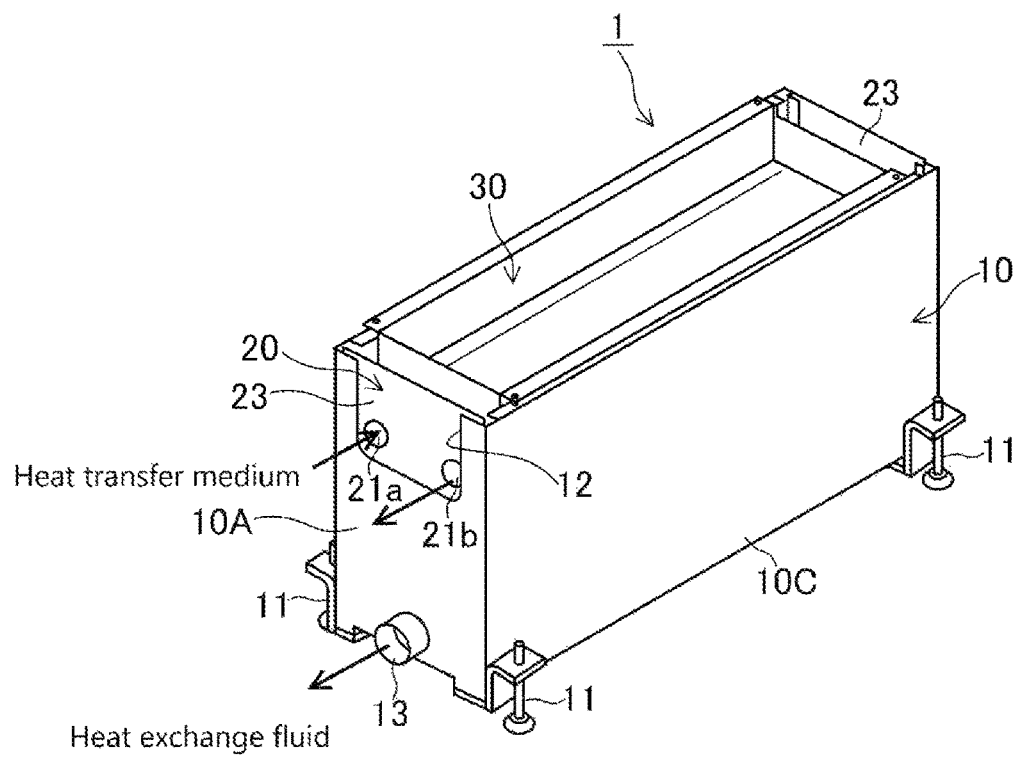
FIG. 1 is a perspective view of a heat exchanging apparatus according to the present invention.
Figure 2:
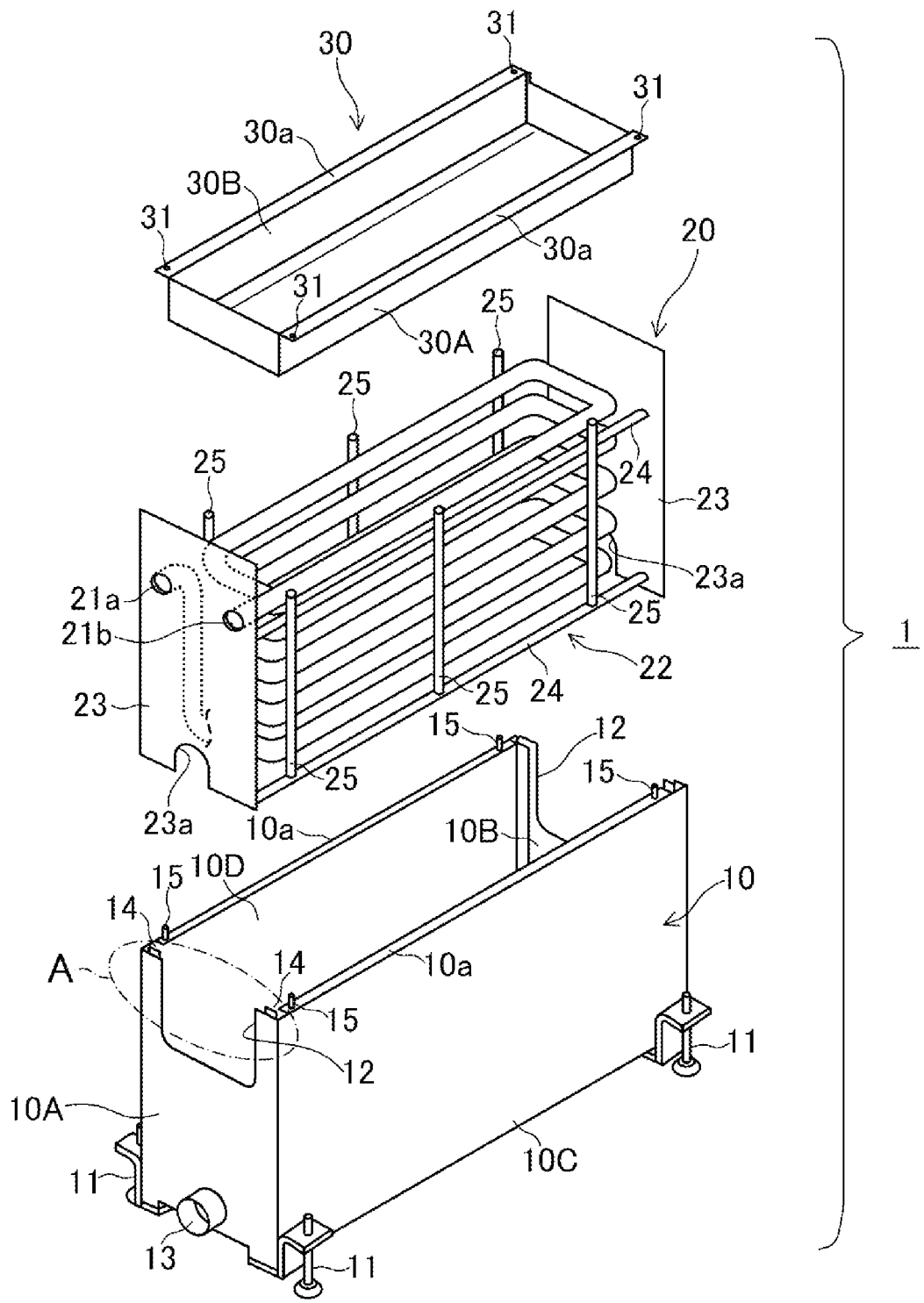
FIG. 2 is an exploded perspective view of a heat exchanging apparatus according to the present invention.
Figure 3:
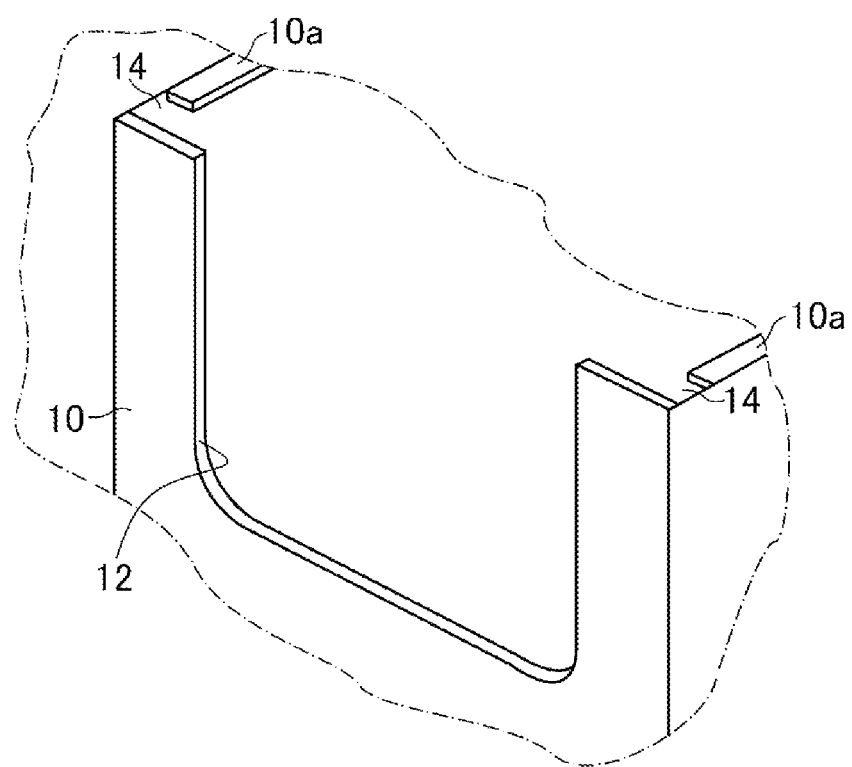
FIG. 3 is an enlarged detailed view of part A in FIG. 2.
Figure 4:
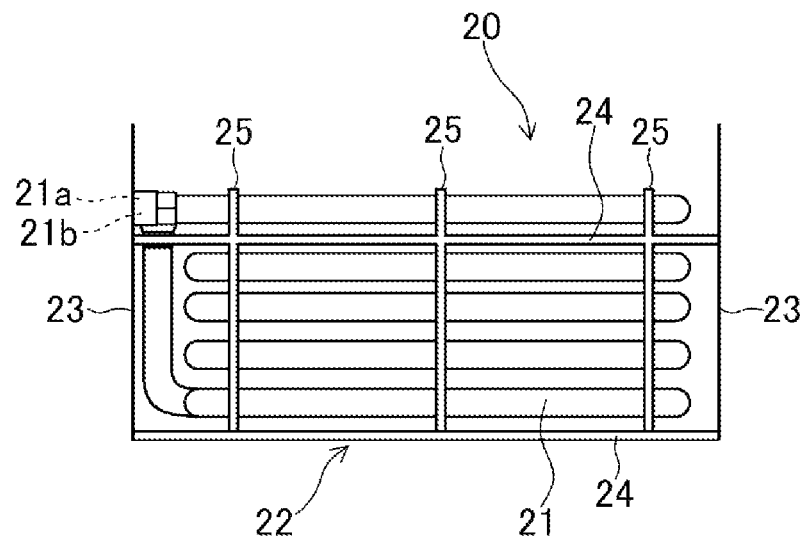
FIG. 4 is a front view of a heat exchange unit according to the present invention.
Figure 5:
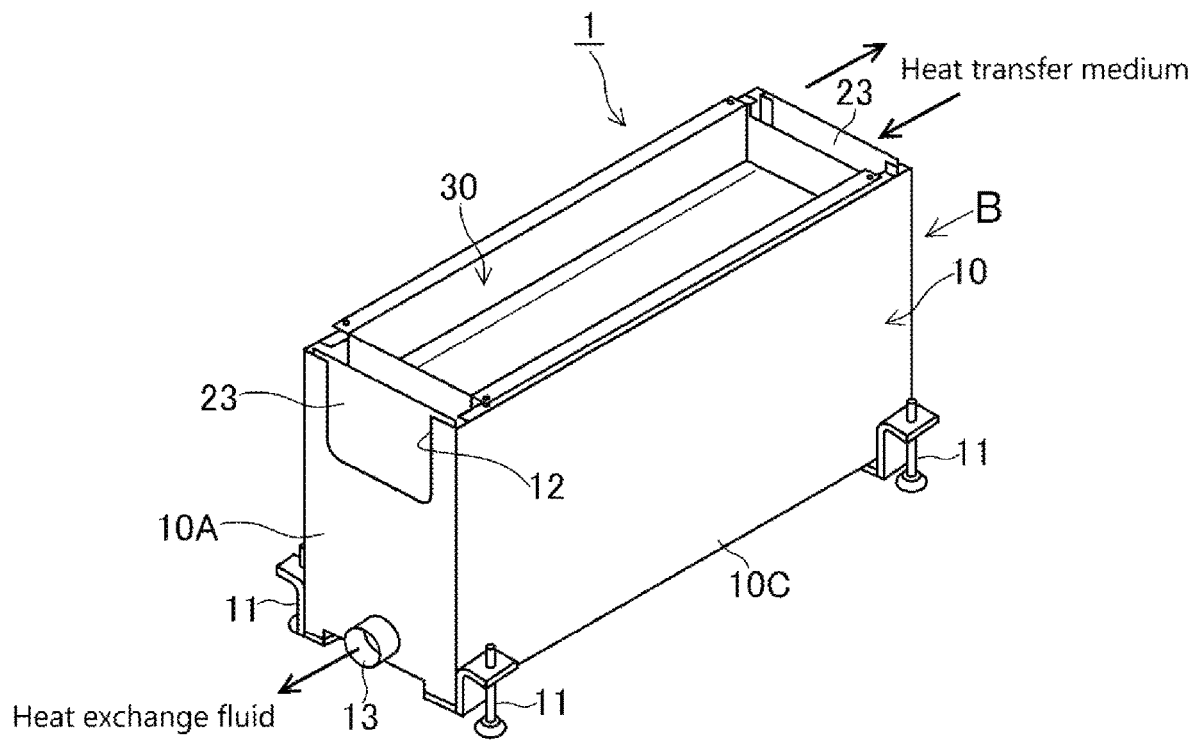
FIG. 5 is a perspective view of a heat exchanging apparatus according to the present invention, of which a heat exchange unit is mounted, horizontally reversed from the state shown in FIG. 1.
Figure 6:
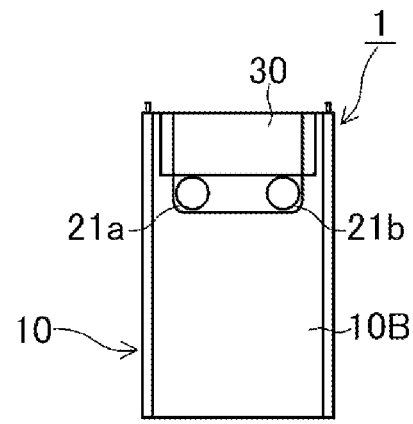
FIG. 6 is a side view of the heat exchanging apparatus shown in FIG. 5 (namely, a view from the direction of arrow B in FIG. 5)
Figure 7:
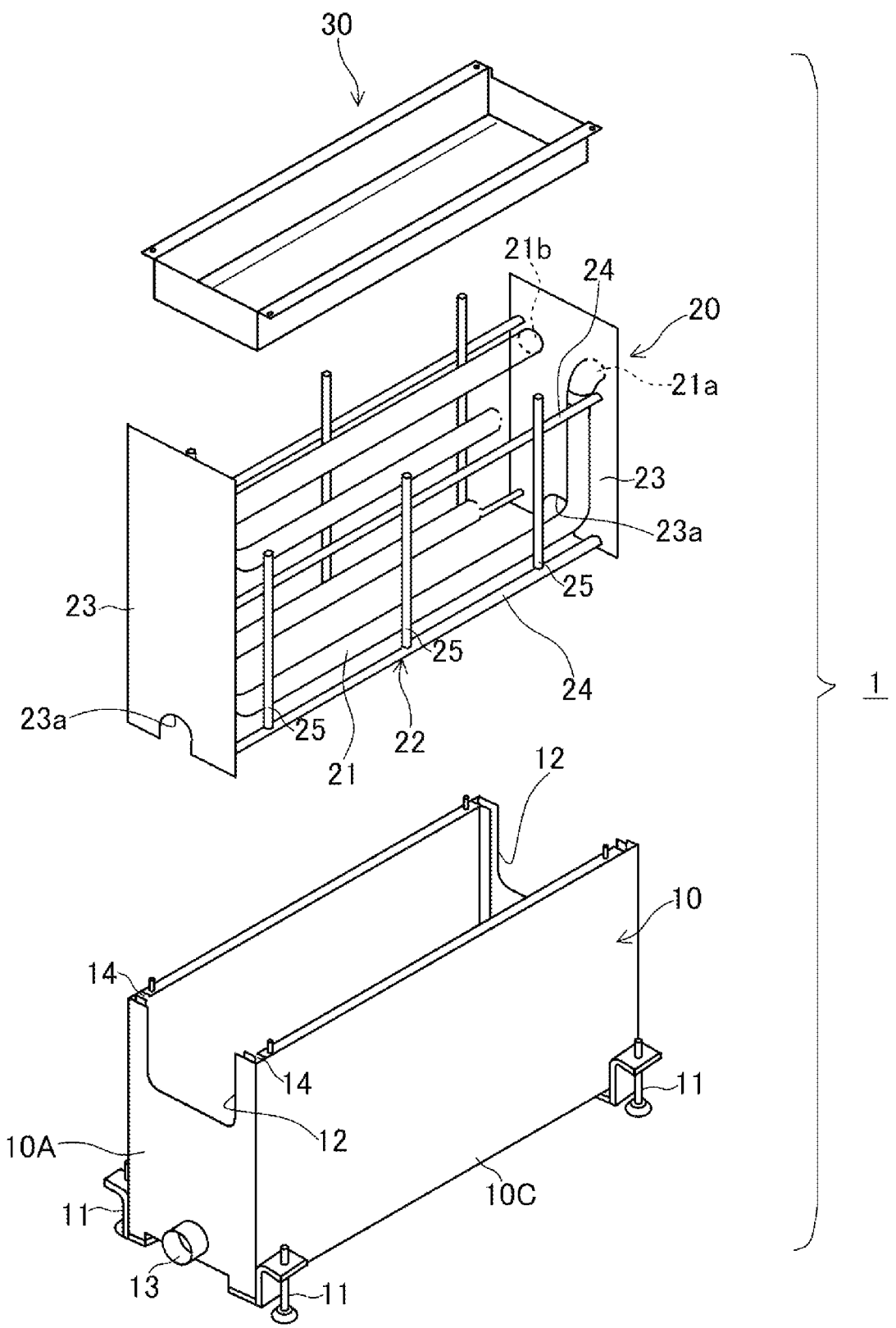
FIG. 7 is an exploded perspective view of the heat exchanging apparatus shown in FIG. 5.

FIG. 1 is a perspective view of a heat exchanging apparatus according to the present invention, FIG. 2 is an exploded perspective view of the heat exchanging apparatus according to the present invention, FIG. 3 is an enlarged detailed view of part A of FIG. 2, FIG. 4 is a front view of the heat exchange unit of the heat exchanging apparatus according to the present invention, FIG. 5 is a perspective view of the heat exchanging apparatus according to the present invention, of which the heat exchange unit is mounted, horizontally reversed from the state shown in FIG. 1, FIG. 6 is a side view of the heat exchanging apparatus shown in FIG. 5 (namely, a view from the direction of arrow B in FIG. 5), and FIG. 7 is an exploded perspective view of the heat exchanging apparatus shown in FIG. 5. It should be noted that in FIG. 7, the description of the heat transfer medium circulation pipe 21 is omitted in part.

The heat exchanging apparatus 1 according to the present invention is a heat exchanging apparatus of the falling liquid film type including as shown in FIGS. 1 and 2, a case 10 open upward, a heat exchange unit 20 housed in the case 10, and a storage tank 30 arranged at an upper section of the case 10. Heat exchange fluid stored in the storage tank 30 drops by its dead weight onto a heat transfer medium circulation pipe 21 of the heat exchange unit 20 so as to exchange heat between the heat exchange fluid and heat transfer medium flowing through the heat transfer medium circulation pipe 21.

The case 10 is made of a metal plate having a low thermal conductivity such as a stainless steel plate formed into an elongated rectangular box shape, and four corners of a lower section thereof are supported by height-adjustable support legs 11. It should be noted that in the following description, as shown in FIGS. 1 and 2, the longitudinal and lateral directions of the case 10 are referred to respectively as "left-right direction" and "front-back direction".

As shown in FIGS. 1 and 2, on each of upper ends of opposite side walls 10A, 10B on the shorter sides (namely, at both ends in the left-right direction) of the case 10, a rectangular notch 12 of the same size and shape open upward is formed. Then, on a lower section of one of the side walls 10A (on the front side, namely at the left end, in FIGS. 1 and 2), a pipe-shaped heat exchange fluid discharge port 13 is formed for discharging the heat exchange fluid falling into the case 10 to the outside of the case 10 as will be described later.

Further, as shown in FIGS. 1 to 3, at each of upper end edges of opposite side walls 10C, 10D on the longer side (namely, at both ends in the front-rear direction) of the case 10, a narrow flange 10a bent inward at a right angle is formed along the longitudinal direction (namely, along the left-right direction). Then, as shown in detail in FIG. 3, a rectangular notch is formed at each two opposite positions, namely at a total of four positions, of which only two are shown in FIG. 3, at both ends in the longitudinal direction (left-right direction) of both flanges 10a. Each of the notches 14 functions as a guide means for guiding the heat exchange unit 20 when the heat exchange unit 20 is vertically taken in and out of the case 10 as will be described later.

Further, as shown in FIG. 2, a positioning pin 15 is erected in the vicinity of each of the notches 14 of each of the flanges 10a of the case 10.

As shown in FIGS. 2 and 4, the heat exchange unit 20 includes the heat transfer medium circulation pipe 21 wound spirally (namely, in an oval ring shape) along the vertical direction and a rectangular frame body 22 for housing and holding the heat transfer medium circulation pipe 21.

The rectangular frame 22 includes two left and right rectangular plate-shaped fixing plates 23 standing vertically, each two upper and lower horizontal bars 24 horizontally bridged between front ends and between rear ends of the fixing plates 23, and each three vertical bars 25 bridged vertically at appropriate intervals in the left-right direction between the two front upper and lower horizontal bars 24 and between the two rear upper and lower horizontal bars 24, in which the heat transfer medium circulation pipe 21 is housed and held.

The heat transfer medium circulation pipe 21 circulates a heat transfer medium such as a refrigerant (water, freon, etc.) and a heating medium (steam, etc.) inside□ As shown in FIG. 1, both ends of the heat transfer medium circulation pipe 21 rise vertically along the inside of the side wall 10A at the left end of the case 10 and penetrate through one of the fixing plates 23 (namely, the left one) to be open on an upper section of the left fixing plate 23 side by side in the front-rear direction. One of the openings constitutes the heat transfer medium inlet 21a, and the other constitutes the heat transfer medium outlet 21b. As described above, the heat transfer medium inlet 21a and the heat transfer medium outlet 21b of the heat transfer medium circulation pipe 21 are open side by side at the same height position on the upper section of one of the fixing plates 23 (namely, of the left one in the illustrated example) toward the same direction (namely, to the left direction in the illustrated example). As the material of the heat transfer medium circulation pipe 21, it is preferable to select copper or copper alloy having a large thermal conductivity.

Moreover, as shown in FIG. 2, a notched circular communication hole 23a open downward is formed at the central part in the front-rear direction of a lower end of each of the two left and right fixing plates 23. It should be noted that when the heat exchange unit 20 is housed in the case 10, one of the two communication holes 23a (namely, the left one in the illustrated example) communicates with the heat exchange fluid discharge port 13 formed on one of the side plates 10A of the case 10 (namely, on the left one in the illustrated example).

The storage tank 30 is a rectangular tray-shaped container open upward, in which the heat exchange fluid is stored. It should be noted that a large number of small hole-shaped dripping holes are formed on the bottom surface of the storage tank 30 although they are not shown in the figure.

Here, as shown in FIG. 2, each of upper end edges of front and rear side walls 30A, 30B opposed to each other on the longer side of the storage tank 30 is bent outward at a right angle to form a flange 30a. Positioning holes 31 are formed on both left and right ends of each flange 30a (namely, at two left and right positions corresponding to the positioning pins 15 erected on each flange 10a of the case 10).

Then, from the state shown in FIG. 2, the heat exchange unit 20 of the heat exchanging apparatus 1 is mounted from above and thus housed in the case 10. At this time, the left and right fixing plates 23 of the heat exchange unit 20 are inserted and fitted into the notches 14 serving as the guide means formed at each two opposite positions of the two flanges 10a of the case 10. This enables the heat exchange unit 20 to smoothly drop down into the case 10 with no rattling while being guided by the notch 14 so as to be accurately housed in a proper position. In the state where the heat exchange unit 20 is housed in the case 10 in this manner, as shown in FIG. 1, the heat transfer medium inlet 21a and the heat transfer medium outlet 21b of the heat transfer medium circulation pipe 21, both of which are open on one of the fixing plates 23 (namely, on the left one) of the heat exchange unit 20, face the notch 12 formed on the upper section of the left side wall 10A of the case 10.

After that, the heat exchanging apparatus 1 is assembled upon placement of the flange 30a of the storage tank 30 on the flange 10a of the case 10. At this time, the four total positioning pins 15 formed on the flanges 10a of the case 10 are fitted into the four total positioning holes 31 formed on the flanges 30a of the storage tank 30. This enables the storage tank 30 to be placed while being accurately positioned on the upper section of the case 10.

In the examples shown in FIGS. 1 and 2, the heat exchange fluid discharge port 13 of the case 10 is open in the same direction as the opening direction (namely, leftward) of the heat transfer medium inlet 21a and the heat transfer medium outlet 21b of the heat transfer medium circulation pipe 21 provided in the heat exchange unit 20.

In the heat exchanging apparatus 1 configured as described above, when the heat exchange fluid stored in the storage tank 30 drops onto the heat exchange unit 20 in the case 10 by its dead weight through the large number of dripping holes (not shown in the figure) formed on the bottom surface of the storage tank 30, the heat exchange fluid flows down in the form of a liquid film along the outer surface of the heat transfer medium circulation pipe 21 of the heat exchange unit 20. Here, in the heat transfer medium circulation pipe 21 of the heat exchange unit 20, the heat transfer medium circulates in the heat transfer medium circulation pipe 21 in the manner that the heat transfer medium flows in from the heat transfer medium inlet 21*a*, flows spirally from downward to upward in the heat transfer medium circulation pipe 21, and is then discharged from the heat transfer medium outlet 21*b* to the outside of the case 10.

Therefore, in the process of flowing down in the form of a liquid film along the outer surface of the heat transfer medium circulation pipe 21, the heat exchange fluid is cooled or heated by exchanging heat with the heat transfer medium flowing through the heat transfer medium circulation pipe 21 and eventually falls down to the bottom of the case 10.

As described above, the heat exchange fluid having exchanged heat with the heat transfer medium and fallen down to the bottom of the case 10 is discharged to the outside of the case 10 through the communication hole 23*a* of the fixing plate 23 and the heat exchange fluid discharge port 13 of the case 10 communicating with each other.

Here, depending on given piping conditions at the installation site of the heat exchanging apparatus 1, it may be convenient that the opening direction of the heat transfer medium inlet 21*a* and the heat transfer medium outlet 21*b* of the heat transfer medium circulation pipe 21 is opposed to the opening direction of the heat exchange fluid discharge port 13 formed on the case 10.

In the above case, the heat exchange unit 20 is slid upward to be taken out from the case 10 as shown in FIG. 2, and then the heat exchange unit 20 having taken out is rotated by 180 degrees around the vertical axis to be horizontally reversed as shown in FIG. 7. Then, the opening direction of the heat transfer medium inlet 21*a* and the heat transfer medium outlet 21*b* of the heat transfer medium circulation pipe 21 in the heat exchange unit 20 is opposed to the opening direction of the heat transfer fluid discharge port 13 formed on the case 10. In other words, as shown in FIG. 6, while the heat transfer medium inlet 21*a* and the heat transfer medium outlet 21*b* of the heat transfer medium circulation pipe 21 are open so as to face the notch 12 formed on the right side wall 10B of the case 10, the heat exchange fluid discharge port 13 formed on the case 10 is open on the left side of the case 10.

The assembly of the heat exchanging apparatus 1 with the heat exchange unit 20 horizontally reversed is completed in the manner as described above, namely, by taking out the heat exchange unit 20 from the case 10 to be horizontally reversed, dropping down and then housing the heat exchange unit 20 in the case 10 as shown in FIG. 5, and then installing the storage tank 30 on the upper section of the case 10. In this manner, owing to the communication holes 23*a* formed on both left and right fixing plates 23, either one of these communication holes 23*a* communicates with the heat exchange fluid discharge port 13 of the case 10 in the heat exchanging apparatus 1 provided with the horizontally reversed heat exchange unit 20. Therefore, even when the heat exchange unit 20 is horizontally reversed, the heat exchange fluid falling into the case 10 can be discharged to the outside through the communication hole 23*a* on the fixing plate 23 and the heat exchange fluid discharge port 13 on the case 10.

And also in the heat exchanging apparatus 1 provided with the horizontally reversed heat exchange unit 20, in the manner as described above, when the heat exchange fluid stored in the storage tank 30 drops onto the heat exchange unit 20 by its dead weight inside the case 10 through the large number of dripping holes (not shown in the figure) formed on the bottom surface of the storage tank 30, the heat exchange fluid is cooled or heated by exchanging heat with the heat transfer medium flowing through the heat transfer medium circulation pipe 21 in the process of flowing down in the form of a liquid film along the outer surface of the heat transfer medium circulation pipe 21 of the heat exchange unit 20.

As described above, according to the heat exchanging apparatus 1 of the present invention, if the opening direction of the heat transfer medium inlet 21*a* and the heat transfer medium outlet 21*b* of the heat transfer medium circulation pipe 21 is incompatible with the opening direction of the heat exchange fluid discharge port 13 formed on the case 10 under given piping conditions at the installation site of the heat exchanging apparatus 1, the opening direction of the heat transfer medium inlet 21*a* and the heat transfer medium outlet 21*b* and the opening direction of the heat exchange fluid discharge port 13 formed on the case 10 can be adjusted to meet the piping conditions at the installation site by taking out the heat exchange unit 20 upward from the case 1, rotating it 180 degrees around the vertical axis, and then storing it in the case 10. Accordingly, only one type of heat exchanging apparatus 1 needs to be made available, whereby man-hours for manufacturing, managing, and installing the heat exchanging apparatus 1 can be reduced for cost reduction.

In addition, no sealing material is required for sealing between the case 10 and the heat exchange unit 20, realizing reduction in the number of parts and simplification of maintenance.

Moreover, in the present embodiment, in the case 10, the notch 12 of the same size and shape open upward is formed at each of the upper ends of the pair of the opposite side walls 10A, 10B respectively in the same direction as and in the opposite direction to the opening direction of the heat transfer medium inlet 21*a* and the heat transfer medium outlet 21*b* so that the heat transfer medium inlet 21*a* and the heat transfer medium outlet 21*b* can face either one of the notches 12. This can achieve the effects as follows. That is, regardless of the housing direction of the heat exchange unit 20 in the case 10, the heat transfer medium inlet 21*a* and the heat transfer medium outlet 21*b* of the heat transfer medium circulation pipe 21 provided in the heat exchange unit 20 can face either one of the notches on the case 10. Further, the notch 12 formed on the case 10 open upward never prevents the heat exchange unit 20 from being taken in and out of the case 10.

Moreover, in the present embodiment, the heat transfer medium inlet 21*a* and the heat transfer medium outlet 21*b* of the heat transfer medium circulation pipe 21 are open on one of the pair of the fixing plates 23 provided in the heat exchange unit 20, and the communication holes 23*a*, one of which communicates with the heat exchange fluid discharge port 13 on the case 10, are formed on the lower sections of both fixing plates 23. This can achieve the effects as follows. That is, regardless of the housing direction of the heat exchange unit 20 in the case 10, one of the communication holes 23*a* formed on both fixing plates 23 communicates with the heat exchange fluid discharge port 13 on the case. Thus, even if the housing direction of the heat exchange unit 20 is changed, the heat exchange fluid falling inside the case 10 can be reliably discharged to the outside of the case 10 through the communication hole 23a and the heat exchange fluid discharge port 13 communicating with each other.

Moreover, in the present embodiment, the notch 14 serving as the guide means is formed at the flange 10a of the case 10 for guiding a slide in the vertical direction when the heat exchange unit 20 is taken in and out, so that when taking the heat exchange unit 20 in and out of the case 10, the heat exchange unit 20 can smoothly slide up and down while being guided by the notch 14. Therefore, the heat exchange unit 20 can be taken in and out of the case 10 stably and reliably with no rattling. The notch 14 serving as the guiding means can be easily formed at the flange 10a of the case 10.

The present invention is not limited to the embodiments described above, and various modifications can be made within the scope of the claims and the technical ideas described in the specification and drawings.

The invention claimed is:

1. A heat exchanging apparatus comprising:
a case open upward;
a heat exchange unit housed in the case; and
a storage tank arranged at an upper section of the case;
wherein heat exchange fluid stored in the storage tank drops onto a heat transfer medium circulation pipe of the heat exchange unit by dead weight to exchange heat between the heat exchange fluid and a heat transfer medium, the heat transfer medium flowing through the heat transfer medium circulation pipe;
wherein a heat transfer medium inlet and a heat transfer medium outlet are open in a same direction at both ends of the heat transfer medium circulation pipe, and a heat exchange fluid discharge port for discharging the heat exchange fluid having dropped in the case is formed on a side wall of the case either in the same direction as or in the opposite direction to an opening direction of the heat transfer medium inlet and the heat transfer medium outlet;
wherein the heat exchange unit comprises a heat transfer medium circulation pipe wound spirally along the vertical direction and a rectangular frame for housing and holding the heat transfer medium circulation pipe;
wherein the heat transfer medium inlet and the heat transfer medium outlet are open on a fixing plate, wherein the fixing plate is one of two fixing plates that is vertically installed at one end of the rectangular frame; and
wherein a communication hole is formed on each of the lower sections of both fixing plates so that either one of the communications holes communicates with the heat exchange fluid discharge port.

2. The heat exchanging apparatus according to claim 1, wherein the case comprises a rectangular box open upward;
wherein a notch of the same size, shape, and upward oriented opening is formed at each of the upper ends of a pair of the opposite side walls respectively in the same direction as and in the opposite direction to the opening direction of the heat transfer medium inlet and the heat transfer medium outlet, so that the heat transfer medium inlet and the heat transfer medium outlet face either one of the notches.

3. The heat exchanging apparatus according to any of claim 1, wherein the case is provided with a guide means for guiding a slide of the heat exchange unit in the vertical direction when the heat exchange unit is taken in and out.

4. The heat exchanging apparatus according to claim 3, wherein the guide means comprises a notch formed at each two opposite positions at both ends in the longitudinal direction of two flanges, the flanges formed by bending inward at a right-angle upper end edges of two opposite side walls of the case so that the fixing plate can be fitted into the notch.

\* \* \* \* \*